Dec. 18, 1962  E. LAVIN ET AL  3,069,379
COMPOSITION COMPRISING A POLYVINYL ACETAL, A PHENOL-ALDEHYDE
RESIN AND A POLYISOCYANATE, PROCESS FOR PREPARING
SAME, AND ELECTRICAL CONDUCTOR COATED THEREWITH
Filed April 13, 1959

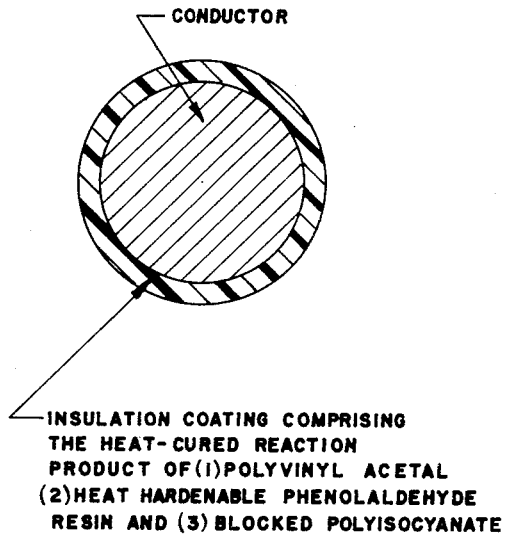

CONDUCTOR

INSULATION COATING COMPRISING
THE HEAT-CURED REACTION
PRODUCT OF (1) POLYVINYL ACETAL
(2) HEAT HARDENABLE PHENOLALDEHYDE
RESIN AND (3) BLOCKED POLYISOCYANATE

EDWARD LAVIN
ANDREW F. FITZHUGH   INVENTORS
ROBERT N. CROZIER

BY  *Karl H. Haag*
ATTORNEY

United States Patent Office 3,069,379
Patented Dec. 18, 1962

3,069,379
COMPOSITION COMPRISING A POLYVINYL ACETAL, A PHENOL-ALDEHYDE RESIN AND A POLYISOCYANATE, PROCESS FOR PREPARING SAME, AND ELECTRICAL CONDUCTOR COATED THEREWITH
Edward Lavin and Andrew F. Fitzhugh, Longmeadow, and Robert N. Crozier, Wilbraham, Mass., assignors, by mesne assignments, of one-half interest to Shawinigan Resins Corporation, Springfield, Mass., a corporation of Massachusetts and one-half interest to Phelps Dodge Copper Products Corporation, New York, N.Y., a corporation of Delaware
Filed Apr. 13, 1959, Ser. No. 805,656
10 Claims. (Cl. 260—43)

This invention relates to polyvinyl acetal coating compositions. More particularly, this invention relates to coating compositions comprising polyvinyl acetals, phenolic resins and certain polyurethanes.

Polyvinyl acetals modified with phenolic resins are well known being used extensively as coatings in various applications such as can linings and as electrical insulations. They are also used as structural adhesives, particularly as taught by de Bruyne in U.S.P. 2,499,134. A delicate balance of many varied properties is required for these applications and much work has been done to improve the characteristics desired since the formulations were first shown by Jackson and Hall in U.S.P. 2,307,588.

Some recent work is disclosed by Daszewski in U.S.P. 2,730,466, Emig et al. in U.S.P. 2,668,157 and Anderson in U.S.P. 2,574,313. Most of the new compositions have included extremely minor amounts of various additives to improve the preferred commercial compositions comprising generally 100 parts of polyvinyl acetals and 50 parts of phenolic resin.

The present inventors have revealed new coating compositions in Australian Patent 206,454, issued Feb. 20, 1957 (U.S. Ser. No. 494,535 filed March 13, 1955) which comprise polyvinyl acetals with certain polyurethanes. These compositions possess the solderability lacking in the phenolic modified polyvinyl acetals. The present application is a continuation-in-part of our prior application Ser. No. 494,535 filed on March 5, 1955.

An object of this invention is to provide polyvinyl acetal compositions with improved resistance to various organic solvents.

Another object is to provide coating compositions with improved heat life as measured by flexibility and dielectric strength. A still further object is to obtain improved cut-through temperatures.

A particular object of this invention is to provide improved wire enamels for use as electrical insulation.

These and other objects are attained with coating compositions comprising 100 parts polyvinyl acetal, 1–50 parts heat-hardenable phenol-aldehyde resin and 2–80 parts blocked polyisocyanates.

This invention is illustrated but not limited by the following examples in which the parts are by weight. The examples listed as controls do not contain a polyisocyanate and are typical commercial polyvinyl acetal-phenol-aldehyde wire coating compositions.

|   | Phenol-aldehyde resin, parts | Blocked polyisocyanate, parts | Polyvinyl formal, parts |
|---|---|---|---|
| Ex. 1 | 10 | 60 | 100 |
| Ex. 2 (control) | 50 | | 100 |

The phenol-aldehyde resin was produced by refluxing a mixture of 100 parts of commercial cresylic acid (a mixture of meta and para cresols with a minor amount of xylenols) 60, parts of formalin (an aqueous solution containing 37% formaldehyde) and 3.2 parts triethanolamine at about 80° C. for about 2.5 hours. The reaction product was thereupon dehydrated under vacuum and the resin obtained as a dark viscous liquid.

The blocked polyisocyanate was a polyurethane represented by the formula

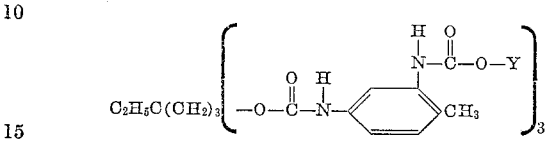

where Y is a meta methyl phenyl group.

The polyvinyl formal contained about 10% acetate groups calculated as polyvinyl acetate, about 6% hydroxyl groups calculated as polyvinyl alcohol and the remainder was substantially formal groups.

The material in Examples 1 and 2 were dissolved in a mixture of 170 parts high solvency coal tar hydrocarbons (B.P. 150–200° C., composed principally of alkyl benzenes, approximately 80% being trimethyl and tetramethyl benzenes) and 100 parts of cresylic acid. (The phenol-aldehyde resin is obtained commercially as a solution in cresylic acid. The amount of phenolic resin indicated in the example is without any solvent; whatever solvent was incorporated with this resin is included in the solvent totals indicated.)

Copper wire having a diameter of about 0.05 inch was coated with these compositions and cured by conventional means as is well known commercially in the field of wire insulating and as is shown in U.S.P. 2,307,588. The curing temperature was about 350° C. in a 3 to 4 foot zone of a twelve foot vertical oven. Six successive coatings were dried and cured on the wire.

Samples of the coated wire were thereupon crossed at 90° and a load of 5 pounds was placed at the junction. The temperature was raised at a rate of 10° C. per minute until shorting at the junction closed an indicator circuit thereby determining the cut-through temperature.

The cut-through temperature for Example 1 was over 260° C. while for Example 2 it was 212° C. indicating that the presence of the blocked polyisocyanate raised the cut-through temperature of conventional phenolic modified polyvinyl acetal coatings drastically.

All other properties of these coatings were practically the same.

Similar insulative coatings on copper wire were prepared from the compositions in the following examples.

|   | Phenol-aldehyde resin, parts | Blocked polyisocyanate, parts | Polyvinyl formal, parts |
|---|---|---|---|
| Ex. 3 | 5 | 45 | 100 |
| Ex. 4 | 2.5 | 67.5 | 100 |
| Ex. 5 (control) | 50 | | 100 |

The percent extractibles of the insulative coatings produced were determined for various solvents.

Methanol and toluene extractibles of the coatings were determined by measuring the loss of weight of a coated wire after being immersed for 2 hours at reflux in the respective solvent and dried for one hour at 150° C. in a mechanical conventional oven.

$CHClF_2$ extractibles were determined by placing the coated wire in a siphon cup and exposing the coating to the solvent for 6 hours at about 225 p.s.i. (40° C.) and drying similarly.

|  | Percent extractibles | | |
|---|---|---|---|
|  | MeOH | Toluene | CHClF$_2$ |
| Ex. 3 | .56 | 1.17 | .44 |
| Ex. 4 | .30 | 0.0 | .30 |
| Ex. 5 (control) | 2.76 | 4.16 | 1.48 |

Enamelled wires were prepared from the following compositions as in Example 1.

|  | Phenol-aldehyde resin, parts | Blocked polyisocyanate, parts | Polyvinyl formal, parts |
|---|---|---|---|
| Ex. 6 | 10 | 60 | 100 |
| Ex. 7 (control) | 50 | | 100 |

Samples of the above prepared wires were tested for their resistance to softening by "Pyranol" by immersing the coated wire in "Pyranol" for 100 hours at 100° C. and determining the decrease in abrasion resistance.

"Pyranol" is General Electric's trademark for askarels used as insulative lubricants in electrical apparatus. These materials comprise mixtures of chlorinated aromatics and are relatively stable to higher temperatures.

Abrasion resistance was determined by the National Electrical Manufacturer's Association test which consists of repeatedly scraping the surface of the coating with a rigid steel blade at a right angle to the wire until the enamel is worn through. A weight of 780 grams is used to press the needle against the coating and the number of strokes required to scrape through the coatings is considered the abrasion resistance.

|  | Original abrasion resistance | "Pyranol" test abrasion resistance |
|---|---|---|
| Ex. 6 | 89 | 71 |
| Ex. 7 (control) | 62 | 8 |

Again the above results indicate the improved solvent resistance of the three component wire coating as compared to standard polyvinyl formal-phenolic coatings.

Enameled wires were prepared from the following compositions as in Example 1.

|  | Phenol-aldehyde resin, parts | Blocked polyisocyanate, parts | Polyvinyl formal, parts |
|---|---|---|---|
| Ex. 8 | 10 | 60 | 100 |
| Ex. 9 (control) | 50 | | 100 |

The flexibility of these coatings on heat aging (flex life) was determined by storing samples of the coated wire at 150° C. and determining the number of hours at which cracking or crazing occurs in the coating when wound around circular mandrels whose diameters were one, two or three times the diameter of the wire. If the coated wire could not be flexed around a three diameter mandrel after a period of heat aging without the occurrence of cracking in the coating, the coating was considered to have failed. On the other hand, if the heat aged coated wire passes a three diameter mandrel test, then successively smaller mandrels are employed to determine the smallest diameter mandrel the sample will pass after such aging. Therefore in the following test results, the FIGURE 3 indicates that the smallest diameter mandrel, around which the sample can be flexed without cracking after the period of heat aging listed, is a mandrel 3 times the diameter of the wire.

Dielectric aging was determined on coated wires twisted around each other by periodically subjecting a sample to a 1 second exposure of 2 kilovolts. The samples were stored at elevated temperatures and the number of hours required to produce a breakdown of the insulative coating were recorded.

|  | Flex-life at 150° C. | | | | Dielectric aging at 200° C. (in hours) |
|---|---|---|---|---|---|
|  | 64 hours | 80 hours | 96 hours | 112 hours | |
| Ex. 8 | 2 | 3 | 3 | F | 125 |
| Ex. 9 (control) | F | | | | 88 |

The dielectric aging at 160° C. was determined in Examples 10 to 12.

|  | Phenol-aldehyde resin, parts | Blocked polyisocyanate, parts | Polyvinyl formal, parts | Dielectric aging at 160° C. (in hours) |
|---|---|---|---|---|
| Ex. 10 | 10 | 60 | 100 | 950 |
| Ex. 11 | 10 | 80 | 100 | 875 |
| Ex. 12 (control) | 50 | | 100 | 610 |

The above results illustrate the improved dielectric aging for the 3 component system.

The solvent resistance of coatings produced in Examples 13 and 14 was tested by immersion of the coated wires for 10 minutes in a refluxing mixture of equal volumes of ethyl alcohol and toluene. The coatings were thereupon examined for any softening, tackiness, swelling, curling, loosening, blisters or other signs of failure.

|  | Phenol-aldehyde resin, parts | Blocked polyisocyanate, parts | Polyvinyl formal, parts |
|---|---|---|---|
| Ex. 13 | 10 | 60 | 100 |
| Ex. 14 (control) | | 60 | 100 |

The wire enamels of these examples were cured to a dark bake by a somewhat longer exposure to heat than in the other examples in order to accentuate the difference in solvent resistance between the formulations. The coating produced with the 3 component system of this invention (Ex. 13) showed no detrimental effects from the solvent whereas the coating of Example 14 was noticeably softened and loosened at the ends of the wire.

Enameled wires were prepared from the following compositions as in Example 1.

|  | Phenol-aldehyde resin, parts | Blocked polyisocyanate, parts | Polyvinyl formal, parts | Polyvinyl butyral, parts |
|---|---|---|---|---|
| Ex. 15 | 20 | 80 | | 100 |
| Ex. 16 | 50 | | | 100 |
| Ex. 17 (control) | 50 | | 100 | |

The above compositions illustrate that polyvinyl butyrals may also be used satisfactorily in the compositions of this invention. The compositions containing polyvinyl butyral (Ex. 16) possess however, less abrasion resistance than those containing polyvinyl formals (Ex. 17). The formulation of Example 15 therefore included 0.006 part of colloidal polytetrafluoroethylene (as revealed in U.S.P. 2,668,157) and 0.001 part dibutyl phosphoric acid.

Representative properties for the above compositions are as follows:

|  | Cut-through | Abrasion | Flex life hours at 150° C. |
| --- | --- | --- | --- |
| Ex. 15 | 285 | 36 | 180 |
| Ex. 16 | 160 | 5 | 96 |
| Ex. 17 (control) | 222 | 43 | 64 |

The polyvinyl butyral containing compositions of this invention are to be preferred when both a longer flex life and higher cut-through temperature are desired. The solvent extractibles of these compositions are lowered when higher proportions of blocked polyisocyanates are used (e.g. 120 parts). Such compositions will be somewhat more readily cured, that is they cure upon a shorter exposure to heat or at a lower temperature.

It is not intended to limit the compositions of the present invention merely to the concentrations shown in the preceding examples. For example, where higher cut-through temperatures alone are particularly desirable, these may be obtained from concentrations of 2-80 parts of blocked polyisocyanate per 100 parts polyvinyl acetal in the three component system of this invention, without detrimentally affecting any of the other desirable properties. Likewise, when increased solvent and abrasion resistance is of prime importance, this may be obtained from concentrations of 1-50 parts of phenolic resin per 100 parts polyvinyl acetal in the three-component system, without detrimentally affecting other desirable properties. Hence, the critical concentrations for the improved compositions of the present invention are 100 parts polyvinyl acetal, 1-50 parts phenol-aldehyde resin and 2-80 parts blocked polyisocyanates. A composition containing 100 parts polyvinyl acetal, 1-20 parts phenol-aldehyde resin and 40-80 parts blocked polyisocyanate is preferred, however, because the best balance of all desirable properties is obtained in this concentration range. Above 50 parts of phenolic resin per 100 parts of polyvinyl acetal in the three-component system will tend to decrease the flexibility of the products.

To illustrate the three-component system containing lesser amounts of the blocked polyisocyanates, enameled wires were prepared from the following composition as in Example 1:

|  | Phenol-aldehyde resin, parts | Blocked polyisocyanate, parts | Polyvinyl formal, parts |
| --- | --- | --- | --- |
| Ex. 18 | 45 | 5 | 100 |

The cut-through temperature for the enameled wires coated with the above composition averaged more than 300° C.

It is apparent that many widely different embodiments of this invention may be made by those skilled in the art without departing from the scope and spirit thereof.

The polyvinyl acetal resins used in this invention may be any disclosed in U.S. Reissue Patent 20,430 to Morrison et al. The preferred polyvinyl acetals are those formed from the condensation of partially or fully hydroxylated polyvinyl esters with formaldehyde (polyvinyl formal), acetaldehyde, propionaldehyde, of butyraldehyde (polyvinyl butyral). Condensates with higher aldehydes may also be used including aromatic aldehydes such as benzaldehyde. Preferred polyvinyl acetals may contain from 1-35% ester groups, 3-15% hydroxyl groups and the balance substantially acetal groups.

The usable phenol-aldehyde resins include a variety of resin condensates of a phenol and an aldehyde as revealed in U.S.P. 2,307,588. These are soluble, heat-hardenable materials. They are readily available in the open market. These resins may be prepared from various phenols, such as phenol, cresol, xylenols, ethyl phenol, p-t-butyl phenol, etc., and from various lower aldehydes such as acetaldehyde, propionaldehyde and butyraldehyde. Formaldehyde is the more reactive aldehyde and is preferred. In order to obtain heat hardenable resins it is desirable to use from 0.5 to 3 mols of aldehyde for every mol of the phenol.

The blocked polyisocyanates used in this invention are polyurethanes which on heating at above 150° C. yield a polyisocyanate. These materials are also known as hidden and disguised polyisocyanates and are available in various forms commercially (such as, Mondur S and Mondur SH manufactured by Mobay Chemical Company of New Martinsville, West Virginia, and as Desmodur AP Stabil manufactured by Farbenfabriken Bayer of Leverkusen, Germany). Usable materials are revealed in U.S.P. 2,797,232, and British Patent 755,942.

The polyurethane materials are polyisocyanates whose isocyanate groups have been reacted with the reactive hydrogen of another organic compound, the polyurethane reacting as a polyisocyanate when subjected to elevated temperatures. Suitable polyisocyanates include compounds such as phenylene diisocyanates, toluene diisocyanates, naphthalene diisocyanates, diphenylmethane diisocyanates, cyclohexanediol diisocyanates, ethylene diisocyanates, tetramethylene diisocyanates, hexamethylene diisocyanates, methylbenzene triisocyanates, polyisocyanates which are the partial reaction products of diisocyanates or triisocyanates with polyhydric alcohols, and the like, and mixtures thereof. Suitable reactive hydrogen containing materials combining with the polyisocyanates to form the desired polyurethanes include phenols such as phenol, cresol, xylenols, etc., secondary aromatic amines, tertiary alcohols (mono and polyfunctional), amides, lactams, mercaptans, enols and the like. Mixtures thereof can also be used to block polyisocyanates. The preferred blocking agents are compounds with a hydroxyl group attached to an aromatic ring.

One group of blocked polyisocyanates usable in this invention are represented by the general formula

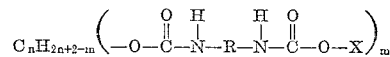

where R represents a member of the class consisting of phenylene, methyl phenylene, dimethyl phenylene, naphthylene and methyl naphthylene groups, X represents a member of the class consisting of phenyl and alkyl phenyl groups, said alkyl groups containing 1-6 carbon atoms, $m$ is an integer greater than 1 but not greater than $n$, and $n$ is an integer from 2-10.

The blocked polyisocyanates are preferably used in this invention at a concentration of 40-80 parts polyisocyanate per 100 parts of polyvinyl acetal. The optimum amounts will depend on the types and amounts of polyvinyl acetal and phenolic resin used and on the characteristics desired in the finished compositions. The preferred proportion will be readily determined by those skilled in the art. The introduction of blocked polyisocyanates into the conventional phenolic resin modified polyvinyl acetal systems improves the cut-through temperatures, flex life, dielectric aging and lowers the solvent extractibles. Excessive amounts of blocked isocyanates will decrease the flexibility of the compositions produced and may decrease the resistance of the product to an alcohol toluene mixture.

The three resinous components of the compositions of this invention are dissolved in a substantially anhydrous organic solvent medium when used for coating purposes. The usual solvent medium comprises a phenol and a hydrocarbon since this combination is the most effective for dissolving polyvinyl acetals. The phenol may be phenol, cresols, xylenols or the like and the hydrocarbon may be an aliphatic compound, or, usually, an aromatic compound such as xylene, naphthalene or mixtures such as the high solvency coal tar hydrocarbons used in the examples. The solids concentration may be varied conveniently, as required, from about 5 to 50% by weight of the solution.

These compositions cure at about 150° C. and above, however temperatures between 200 and 500° C. are preferred. They may be used as surface coatings or as adhesives for a great variety of materials including metals, glass, fibrous products as well as other synthetic resins and plastics. The compositions may also be cast, molded and extruded by the various known mechanical methods. Conventional additives such as fillers, pigments, dyes, stabilizers, lubricants may be added to the starting materials or to solutions of the reactants.

What is claimed is:

1. A composition comprising, in parts by weight, 100 parts polyvinyl acetal, 1–50 parts heat-hardenable phenol-aldehyde resin and 2–80 parts blocked polyisocyanate.

2. The heat-cured reaction product of the composition in claim 1.

3. A coating composition comprising a substantially anhydrous organic solvent solution of 100 parts polyvinyl acetal, 1–50 parts heat hardenable phenol-aldehyde resin and 2–80 parts blocked polyisocyanates.

4. An insulated metal conductor insulated with a coating comprising the heat cured reaction product of claim 1.

5. A composition as in claim 1 wherein the polyvinyl acetal is taken from the group consisting of polyvinyl formal, the polyvinyl acetal of acetaldehyde, polyvinyl butylral, and mixtures thereof.

6. A composition as in claim 1 wherein the heat hardenable phenol-aldehyde resin is the condensation product of a phenol of the group consisting of phenol, cresol, xylenol and mixtures thereof and formaldehyde.

7. A composition as in claim 3 wherein the blocked isocyanate is a polyurethane which on heating at above 150° C. forms a compound containing isocyanate groups.

8. A composition as in claim 7 wherein the polyurethane is a compound represented by the general formula $$C_nH_{2n+2-m}\left(-O-\overset{O}{\underset{\|}{C}}-\overset{H}{\underset{|}{N}}-R-\overset{H}{\underset{|}{N}}-\overset{O}{\underset{\|}{C}}-O-X\right)_m$$

where R represents a member of the class consisting of phenylene, methyl phenylene, dimethyl phenylene, naphthylene and methyl naphthalene groups, X represents a member of the class consisting of phenyl and alkyl phenyl groups, said alkyl groups containing 1–6 carbon atoms, $m$ is an integer greater than 1 but not greater than $n$, and $n$ is an integer from 2–10.

9. A process for preparing a cured resinous composition which comprises heating at a temperature above 150° C., a substantially anhydrous organic solvent solution comprising, in parts by weight, 100 parts polyvinyl acetal, 1–50 parts heat hardenable phenol-aldehyde resin and 2–80 parts of a blocked polyisocyanate.

10. A process for insulating wire which comprises coating the wire with a substantially anhydrous organic solvent solution comprising 100 parts of a polyvinyl acetal taken from the group consisting of polyvinyl formal, the polyvinyl acetal of acetaldehyde, polyvinyl butyral and mixtures thereof, 1–50 parts of a heat hardenable cresol-formaldehyde resin, and 2–80 parts of a polyurethane which on heating at above 150° C. forms a compound containing isocyanate groups, and thereafter simultaneously removing the solvent from the coating and curing the coating on the wire at a temperature of from 200–500° C.

References Cited in the file of this patent

UNITED STATES PATENTS

| | | |
|---|---|---|
| 2,307,588 | Jackson et al. | Jan. 5, 1943 |
| 2,321,627 | Rothrock | June 15, 1943 |
| 2,374,136 | Rothrock | Apr. 17, 1945 |
| 2,454,678 | Smith et al. | Nov. 23, 1948 |
| 2,836,518 | Loritsch et al. | May 27, 1950 |
| 2,532,011 | Dahlquist et al. | Nov. 28, 1950 |